May 8, 1934. G. R. SIBLEY 1,957,853
AUTOMATIC FISH STRIKER
Filed May 16, 1933
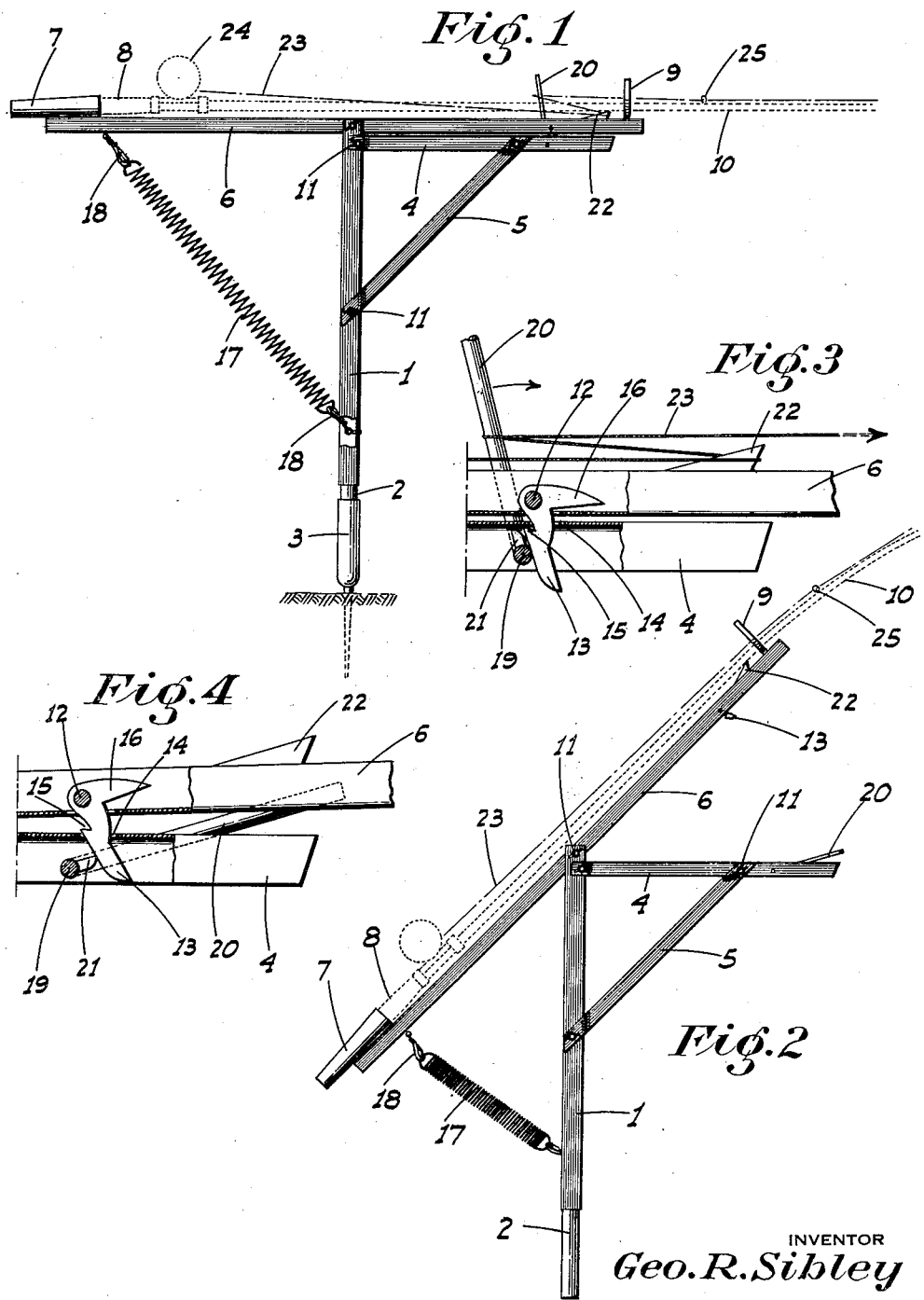
INVENTOR
Geo. R. Sibley
BY
ATTORNEY Patented May 8, 1934

1,957,853

UNITED STATES PATENT OFFICE 1,957,853

AUTOMATIC FISH STRIKER

George R. Sibley, Merced, Calif.

Application May 16, 1933, Serial No. 671,340

6 Claims. (Cl. 43—15)

This invention relates to rod and reel fishing, and particularly to such fishing as is done by sportsmen from the bank of a stream, as is frequently the case when fishing for striped bass and other river fish.

Since the fish are apt to bite somewhat infrequently it is customary for the fisherman to support his rod in an upstanding position on the bank with the line in the water and stroll around or sit down while watching the line for evidence of a bite. At the instant the fish rises to the bait as will be known by the jerking of the line, the fisherman makes a dash for the rod in an endeavor to make a strike. It frequently happens however that by the time he has grasped the pole the fish has got away on account of the instant manipulation of the rod necessary to make the strike.

It is therefore the principal object of my invention to provide a supporting apparatus for a fishing rod so constructed that the instant there is a pull on the line the rod will be given a sudden upward jerking motion of such an extent as to successfully make the strike without any attention on the part of the fisherman, other than to initially set the apparatus. The rod may be then instantly disengaged from the apparatus without the necessity of unfastening any catches or holders and without any loss of time, so that the playing of the fish after the strike is once made may be carried on in the usual and desired manner.

Another object is to construct the apparatus so that the various parts may be readily assembled or taken apart or knocked down, and when in the latter condition the apparatus forms a pack of relatively small dimensions as to width and depth so that it may be conveniently stored in a motor vehicle or carried in the hand.

A further object of the invention is to produce a simple and inexpensive device and yet one which will be exceedingly effective for the purpose for which it is designed.

In the drawing similar characters of reference indicate corresponding parts in the several views:

Fig. 1 is a side elevation of the apparatus as set up in connection with a fish rod and ready for operation.

Fig. 2 is a similar view showing the position of the rod and its supporting bar as being tripped by a pull on the line.

Fig. 3 is an enlarged fragmentary view showing the catch device engaged or in its normal position.

Fig. 4 is a similar view showing the catch released or tripped.

Referring now more particularly to the characters of reference on the drawing, the rigid or frame portion of the apparatus comprises a standard 1 having a cylindrical portion 2 at its lower end adapted to removably seat in a spiked socket 3 of the type commonly used by fishermen in supporting their rods from the ground in an upright position. A horizontal bar 4 projects from one side of the standard adjacent its upper end, being rigidly held in such position by a diagonal brace arm 5 between the bar and standard.

Pivoted intermediate its ends on the standard immediately above the bar and in alinement therewith is a relatively long rod supporting bar 6. At its end furthest from the bar 4 the bar 6 is provided with a longitudinally extending socket 7 for the reception of the handle 8 of the fishing rod; while upstanding from the bar 6 at its opposite end is a fork 9 to support and locate the fishing rod 10 intermediate its ends. The parts 1, 4, 5 and 6 are preferably metal members of channel cross section to combine lightness and strength and they are removably coupled together by wing nut bolts 11 so that they may be easily taken apart and put together, and when detached from each other may be readily tied together or placed in a tube-like bag or sack, so that the apparatus will then occupy but little space in other than its longitudinal dimension, as will be evident.

The bottoms of the channel members 4 and 6 are adjacent each other and freely swinging on a cross pin 12 mounted in the bar 6 adjacent its forward end is a depending dog 13. This dog projects through a slot 14 cut in the top of the bar 4 and is provided with a notch 15 cut in its rear face to engage the corresponding edge of the slot. The dog is also formed with a weighted portion 16 substantially radial with the pin 12 and which tends to hold said dog in a downwardly hanging position. In this manner when the bar 6 is swung down on its pivot the dog will enter the slot of itself and automatically engage the slot edge in holding relation.

A tension spring 17, expanded and under considerable tension when the dog is thus engaged extends between the standard 1 intermediate its ends and the bar 6 adjacent its rear or socket end. The tension of this spring of course acts to hold the dog notch snugly against the under edge of the slot 14 so as to prevent separation of the bars. The spring is connected to the bar and standard by snap hooks 18 or similar disengageable elements so that said spring may be readily uncoupled when the device is to be packed.

Turnably mounted in and extending transversely of the bar 4 just back of the notched edge of the dog is a pin 19 having an upstanding arm 20 on one end and to one side of the bar 6. A trip cam 21 projects radially from the pin 19 in the same direction as said arm and in transverse alinement with the dog. A lug 22, rigid with the bar 6 and on the same side as the arm 20, projects upwardly from said bar in front of the arm or between the position of said arm and the fork 9.

In operation the rod is mounted on the supporting bar 6 in the manner previously explained, and the dog is engaged with the bar 4, the arm 20 being turned upwardly so that the cam 21 also projects upwardly and back of the dog. The line 23 of the fishing rod between the reel 24 and the guide eye 25 on the rod beyond the fork 9, is drawn slack and is passed about the front end of the lug 22, and then back and about the arm 20, as shown in Fig. 3. It will therefore be seen that when the line is pulled from the outer end of the rod as by a fish, such pull is immediately transmitted to the arm 20 pulling the same upwardly. This causes the cam 21 to advance against and push the dog upward until it clears the slot 14. The spring 17 is then of course free to contract and immediately pulls the adjacent portion of the bar down with a sudden motion, causing the forward portion of the bar and the adjacent portion of the fishing rod to be jerked upwardly. There is no danger of the line becoming tangled with the arm 20 or the lug 22, since it will be seen that with the forward and downward movement of the arm the line will slip clear of the same, which also frees the line from the lug and allows it to run directly and freely between the reel and the eye 25, as will be evident from a study of Fig. 3. To then remove the rod from the apparatus for the playing of the fish it is only necessary to disengage the handle from the socket 7 in which said handle has a loose fit.

I claim:

1. An automatic fish striker for use with a fishing rod and its line comprising a vertical supporting standard, a bar projecting forwardly from the standard adjacent its upper end, another bar pivoted intermediate its ends on the standard adjacent said first named bar, means on said other bar to support a fishing rod, normally engaged catch means between the bars, means acting on said other bar to raise the same from the first named bar and restrained from so doing by the catch means, a releasing device for said catch means, and elements connected to the other bar and to said device and engageable with the rod line so as to cause a pull on the line to release the device.

2. An automatic fish striker for use with a fishing rod and its line comprising a vertical supporting standard, a bar projecting forwardly from the standard adjacent its upper end, an upper bar pivoted intermediate its ends on the standard above said first named bar, means on said upper bar to support a fishing rod in position so that the rod extends in the direction of said first named bar, a swingable arm normally projecting upwardly from the first named bar to one side of the same and to a point above the upper bar and rod, a lug rigid with and projecting upwardly from the upper bar ahead of and on the same side as said arm whereby the line from the handle end of the rod may be passed about the lug and then back to and about the rod, normally engaged catch means between the bars, release means for said catch means connected to said arm and actuated by a forward movement of the arm, and a spring between the standard and the upper bar to swing the same so that its forward end is raised and held in restraint when the catch means is engaged.

3. An automatic fish striker for use with a fishing rod and its line comprising a vertical supporting standard, a bar projecting forwardly from the standard adjacent its upper end, an upper bar pivoted intermediate its ends on the standard above said first named bar, means on said upper bar to support a fishing rod in position so that the rod extends in the direction of said first named bar, a swingable arm normally projecting upwardly from one bar to one side of the same and to a point above the upper bar and rod, a swingable catch dog mounted on one bar and normally engaging the other bar to hold said bars adjacent each other, means connected to the arm to engage and release the dog and actuated by a forward swinging of the arm, said arm being engageable with the line of the fishing rod to be thus swung by a pull on the line from the outer end of the rod, and a spring tending to raise the forward end of the upper bar; said spring being under tension when the bars are held together.

4. An automatic fish striker for use with a fishing rod and its line comprising a vertical supporting standard, a bar projecting forwardly from the standard adjacent its upper end, an upper bar pivoted intermediate its ends on the standard above said first named bar, means on said upper bar to support a fishing rod in position so that the rod extends in the direction of said first named bar, a transverse pin turnably mounted in the lower bar, said bar being hollow, an arm upstanding from said pin to one side of the bar and to a point above the supported rod, a catch dog mounted in the upper bar and depending therefrom through a slot in the top of the under bar in front of the pin, said dog having a notch in its rear face to engage under the back end of the slot, a cam on the pin to engage the dog below the notch and push the same clear of its holding engagement with the forward swinging of the arm, a tension spring between the standard and the portion of the upper bar opposite the under bar and tensioned when the catch dog is engaged, and a lug rigid with and projecting upwardly from the upper bar ahead of and on the same side as the arm.

5. A structure as in claim 4, with means acting on the dog to normally position the same so that it will enter the slot and engage the end thereof of itself when the upper bar is depressed from a released position.

6. An automatic fish striker for use with a fishing rod and its line comprising a fixed support, a member to support a rod pivoted on the support, means acting on said member to turn the same, releasable catch means between the support and member to normally hold the latter in a predetermined position and restraining said member turning means, releasing means applied directly to the catch means to release the same, and means directly connected to said release means and engageable by the line for operating said release means by a pull on the line.

GEORGE R. SIBLEY.